Aug. 8, 1950

H. R. WARREN 2,517,948

OSCILLATOR CONTROL ARRANGEMENT FOR DIELECTRIC HEATING SYSTEMS

Filed Jan. 19, 1948

*INVENTOR.*
HENRY R. WARREN
BY
*Woodcock and Phelan*
ATTORNEYS

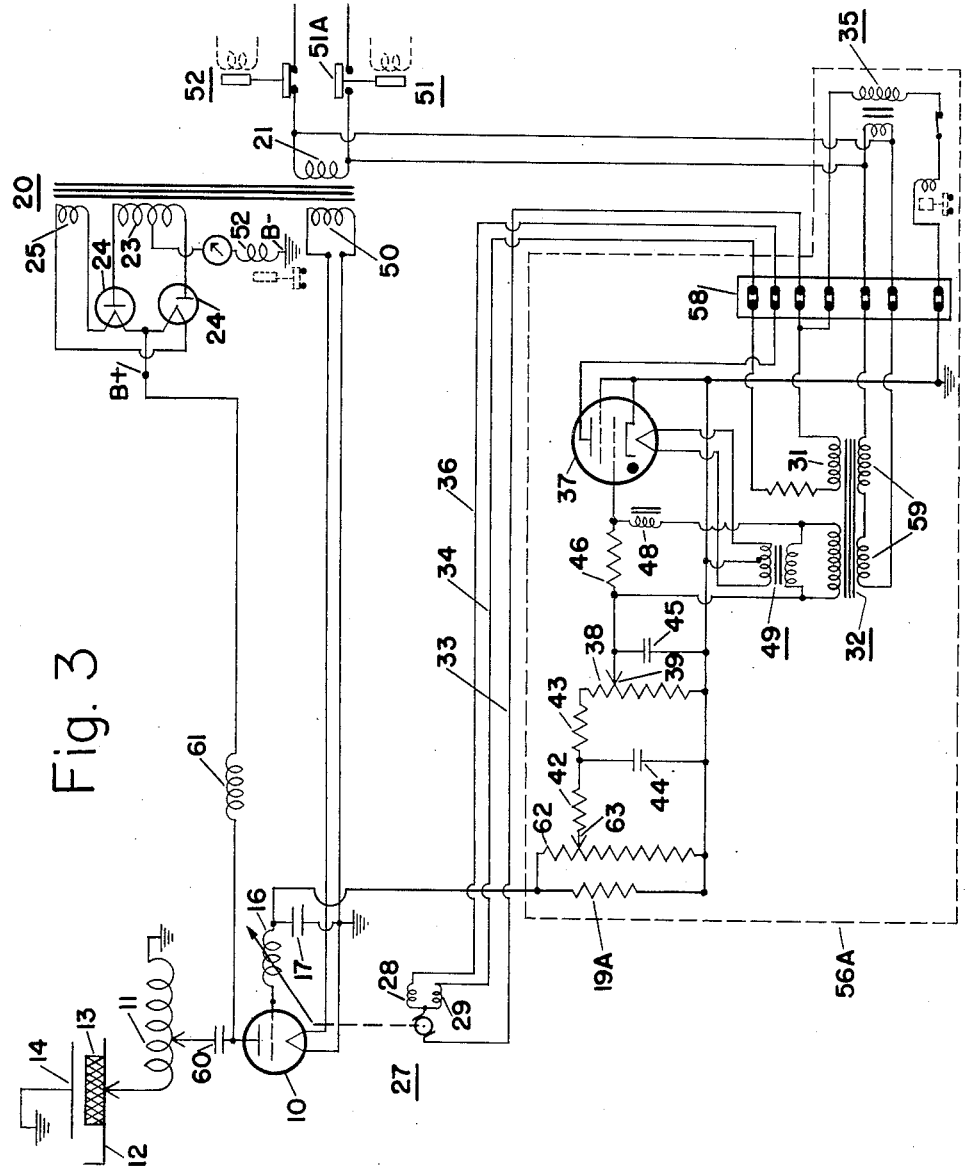

Patented Aug. 8, 1950

2,517,948

UNITED STATES PATENT OFFICE 2,517,948

OSCILLATOR CONTROL ARRANGEMENT FOR DIELECTRIC HEATING SYSTEMS

Henry R. Warren, Louisville, Ky., assignor to The Girdler Corporation, Louisville, Ky., a corporation of Delaware Application January 19, 1948, Serial No. 2,996

15 Claims. (Cl. 219—47)

This invention relates to dielectric heating systems, and particularly to control arrangements insuring safe and efficient operation of the high-frequency oscillator tubes used in such systems.

During the heating of a dielectric load, its electrical characteristics may vary with consequent change of the potentials of the electrodes of the associated oscillator tube to magnitudes at which the tube may operate inefficiently and in many cases dangerously beyond the rated dissipation of its anode or grid.

In accordance with the present invention, inefficient operation of the oscillator tube is precluded by a control arrangement including an oscillator circuit reactance adjustable by a continuously energized motor whose torque is insubstantial and therefore ineffective to vary said reactance so long as the tube is operating under efficient or safe conditions, but which is effective to vary the reactance in a compensating sense when the potential of a selected electrode of the oscillator tube departs from optimum or safe magnitude. More specifically, one winding of the motor may be continuously energized from a low-frequency power source and the other winding may be energized from the same source through a gaseous discharge tube whose direct current grid bias varies as a function of the potential of the selected oscillator electrode. More particularly, the grid bias of the discharge tube also has an alternating component having a predetermined phase relation with respect to the anode potential of the discharge tube, and which jointly with the magnitude of the D. C. bias determines the percentage of the cycle during which the discharge tube is conductive.

Further in accordance with the invention, the motor current energizes a relay effective to interrupt the anode current supply of the oscillator when the load change is greater than can be compensated for within the limits of adjustment of the aforesaid reactance.

The invention further resides in features of construction, combination and arrangement hereinafter described and claimed.

For a more detailed understanding of the invention, reference is made to the accompanying drawings, in which:

Fig. 3 is a schematic circuit diagram of a dielectric heating system embodying another form of the invention.

Figure 1:
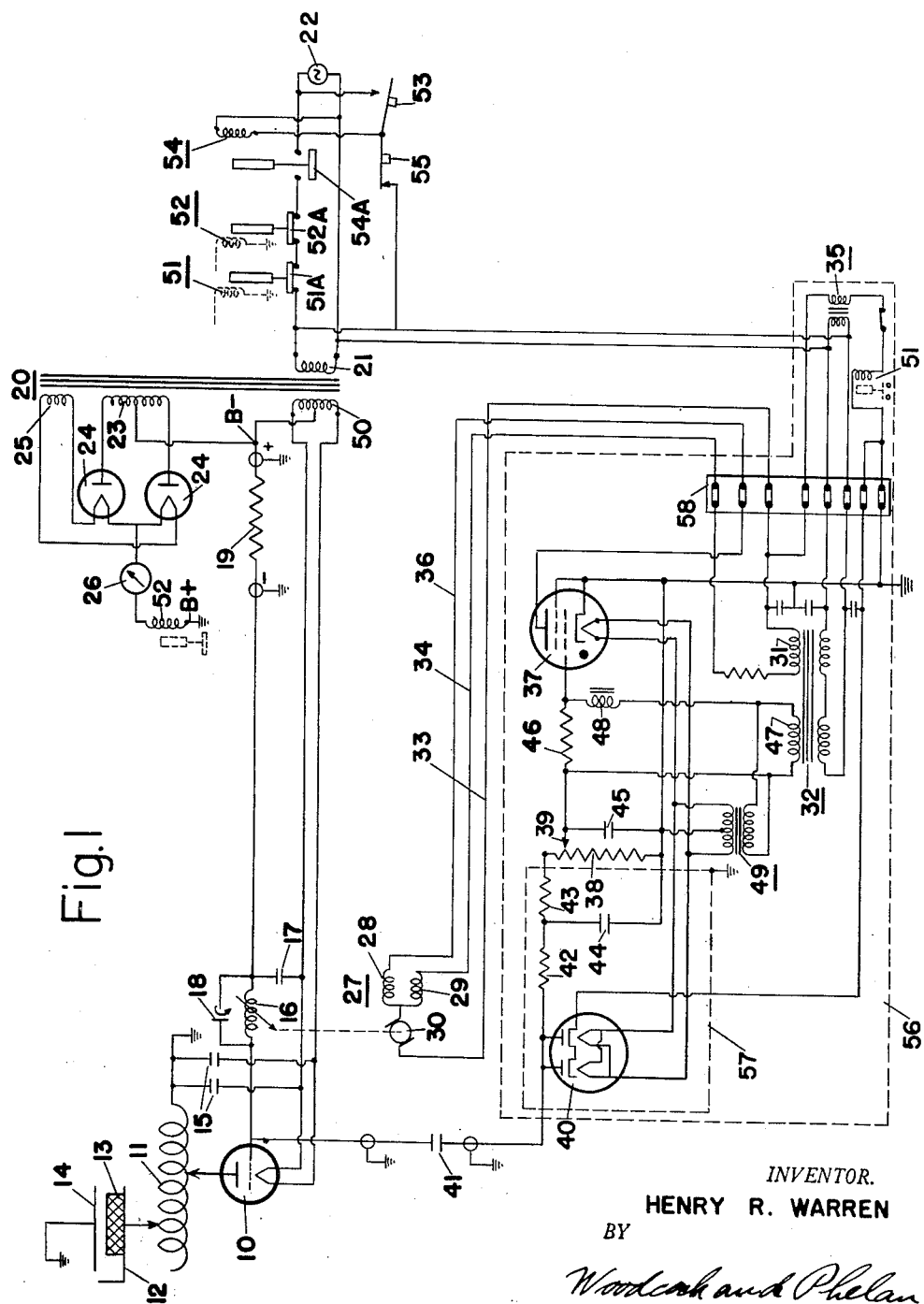
Fig. 1 is a schematic circuit diagram of a dielectric heating system including one modification of the invention.

Referring to Fig. 1 as exemplary of one form of dielectric heating system utilizing the invention, the anode of the oscillator tube 10 is connected to the tank coil 11 in turn connected to a tray electrode 12 upon which is disposed the dielectric load 13 to be heated. The upper electrode 14, which may be suitably spaced from the load, is connected to a suitable point at cathode or ground potential. The capacitive reactance of the condenser formed by electrodes 12 and 14, in conjunction with the coil 11, determines or affects the frequency of the oscillations generated by tube 10. The anode-cathode circuit of the tube 10 also includes, so far as the generated high-frequency oscillations are concerned, the bypass condensers 15—15 respectively connected from the cathode leads to the grounded terminal of coil 11.

The high-frequency grid circuit of the tube 10 comprises the coil 16 and bypass condenser 17 in series between the grid and cathode of the tube. The coil 16 may be shunted by a variable condenser 18, preferably of the type later hereinafter specifically described: when the variable condenser is used, the oscillator is of the tuned-grid, tuned-plate type: when variable condenser 18 is not used, the coil 16 is itself broadly resonant and the oscillator is of the so called TNT type (tuned-plate, untuned grid). The feedback coupling between the anode and grid circuits required for generation of oscillations by the tube 10 is afforded by the inter-electrode capacity between the grid and anode of tube 10, supplemented if necessary by an external capacitor, not shown.

The direct current operating potential of the grid is the voltage drop across resistor 19 resulting from flow therethrough of the direct current component of the grid current. As the high-frequency potential of the grid varies with the load upon the oscillator tube, the rectified direct current component correspondingly changes, as later herein discussed, with consequent change of the direct current bias of the grid.

The anode of tube 10 is connected through the grounded tank coil 11 to the positive terminal (B+) of a suitable source of high voltage whose negative terminal (B—) is connected to the cathode of the oscillator tube. As shown in simplified form, the direct current supply system for the oscillator may comprise a transformer 20 whose primary winding 21 is energized from a suitable low-frequency power source 22 of alternating current. The terminals of the high voltage secondary winding 23 of transformer 20 may be connected respectively to the anodes of the high voltage rectifier tubes 24—24 whose cathodes are heated by current from the low voltage secondary winding 25 of transformer 20. The cathodes of the rectifier tubes 24—24 are connected to ground. The center tap of the high voltage winding 23 is connected to the cathode of the tube 10. An ammeter 26 may be included in the direct-current anode circuit, preferably in the ground connection from the rectifier cathodes, to indicate the magnitude of the direct current component of the anode current of oscillator tube 10.

During heating of the dielectric load 13, its electrical characteristics, specifically its dielectric constant and resistivity, markedly change, affecting both the frequency of the oscillations generated by tube 10 and also the load demand upon the oscillator. The changes in load and frequency affect, with respect to ground, the potentials of the grid and anode electrodes of the oscillator tube, and of the heating electrode 12. In general, the operating conditions are so disturbed that the tube operates inefficiently, producing less high-frequency output for heating of the load and with increased dissipation of power within the tube; in not unusual cases, the changes in electrical characteristics of the dielectric load 13 are so great that the tube 10 operates dangerously beyond its safe anode or grid dissipation rate. In general, overheating of the anode occurs when the grid driving voltage is too low as usually occurs when the anode-circuit loading is too heavy and overheating of the grid occurs when the grid driving voltage is too high as usually occurs when the anode-circuit loading is very light.

Within reasonably wide limits, safe and efficient operating conditions of the oscillator may be restored by adjustment of reactance in the oscillator circuit; specifically, the grid inductance 16 or the variable condenser 18, if used, or both inductance 16 and condenser 18, may be varied in compensation for the changes in electrical characteristics of the load 13. In accordance with the present invention, such adjustment is effected immediately and continuously in accordance with departure from a desired or optimum magnitude of one of the aforesaid potentials by continuously energized motor 27. In subsequent discussion of Fig. 1, it will be assumed the adjustment is of the inductance of coil 16.

As shown in Fig. 1, the motor 27 may be of the so-called universal type having split field windings 28—29 in series with an armature 30 of the commutator type. Winding 29 and armature 30 are continuously energized by alternating current of fixed magnitude supplied, for example, by the secondary winding 31 of a transformer 32 connected to a low-frequency power source 22. This circuit for supplying continuous and constant excitation for winding 29 of motor 27 includes the conductors 33—34. The other winding 28 of motor 27 is provided with continuous but variable excitation to provide a torque which balances that produced by winding 29 so long as the oscillator tube 10 is functioning normally, but which is unbalanced under all other circumstances so to provide for an adjustment of reactance 16.

The energizing circuit of winding 28 includes conductor 36, the internal anode-cathode resistance of the grid-controlled rectifier tube 37 and the secondary winding of transformer 35 excited from the low-frequency power source 22. The current in winding 28 is therefore unidirectional and of average value determined by the potential of the control grid of tube 37.

As hereinafter explained, the resistor 38 is traversed by direct-current of magnitude which varies in accordance with the radio-frequency potential of the grid of the oscillator tube 10. By adjustment of contact 39 along resistor 38, any desired percentage of the voltage drop across the resistor may be applied between the grid and cathode of tube 37. The resistor 38 is in the output circuit of a rectifier tube 40 whose anode is coupled, as by condenser 41, to the grid of the oscillator tube 10 and whose cathode is connected to ground. A suitable filter comprising for example resistors 42, 43 and condenser 44 minimizes flow through resistor 38 of oscillator-frequency currents. The high-frequency by-pass condenser 45 connected between contact 39 and the cathode end of potentiometer 38 serves further to attenuate any high-frequency potentials otherwise affecting the grid of tube 37, and by-passes to ground the 60 cycle component of the grid voltage.

Preferably, the grid-potential of tube 37 also has an alternating component of fixed magnitude and of fixed phase relation with respect to the alternating anode potential of tube 37. This alternating current bias is produced by flow through resistor 46 of low-frequency alternating current from the secondary winding 47 of transformer 32. The relative magnitude in ohms of the resistance 46 and the inductive reactance of inductor 48 determine the phase-relation between the A. C. grid bias and the A. C. anode potential of tube 37; either 46 or 48, or both, may be adjustable to extend the control range.

The cathode-heating current for the high-frequency rectifier tube 40 and the grid-controlled rectifier tube 37 may be supplied by transformer 49 and the cathode-heating current for the oscillator tube 10 may be supplied by winding 50 of the power transformer 20.

The time in each cycle of its anode potential for which tube 37 is conductive is jointly determined by the A. C. bias and the D. C. bias upon its grid, the A. C. bias tending to render the tube conductive and the D. C. bias, resulting from the negative signal, tending to oppose the A. C. bias. In operation of the system, a departure from the optimum magnitude of the high-frequency potential of the oscillator tube 10 immediately results in change of the D. C. grid potential of tube 37. In consequence, the opposing torques of motor windings 28, 29 are unbalanced and the grid reactance 16 is adjusted by motor 27 in sense to reduce the departure and at a speed which is the higher the greater the departure and vice versa.

Thus, during a heating run, the effect of changes in the electrical characteristics of the dielectric upon anode-circuit efficiency of the oscillator are promptly automatically compensated by proper readjustment of the grid-circuit reactance of the oscillator. To protect the oscillator tube in event the changes are beyond the range of compensation of the reactance, a relay 51 energized by the motor current may be utilized to interrupt the supply of power to the tube; specifically, the movable contact 51A of relay 51 breaks the circuit from transformer 20 to the power source 22 when the current drawn by the reactance-varying motor 27 exceeds a predetermined magnitude. Relay 51 may be in replacement of or in addition to the usual overload relay 52 traversed by the D. C. anode-current of the oscillator tube and having movable contact structure 52A which breaks the power circuit upon occurrence of excessive oscillator anode current.

To initiate and terminate operation of the heating system, there may be provided a contactor 54 manually controlled by a "Start" switch 53 and a "Stop" switch 55. Upon momentary closure of the normally open switch 53, the contactor coil 54 is energized whereupon its contact 54A closes to effect energization of the several transformers of the oscillator and its protective system. Should either of relays 51 or 52 open its contacts during a heating run, the contactor coil is de-energized and the power circuit is broken and remains broken when the relay contacts reclose. At the end of a run, the power circuit is broken by manual or automatic opening of the normally closed switch 55 to effect deenergization of the contactor coil.

Preferably all or most of the components for controlling the energization of motor 27 are mounted as a unit 56, generically represented by dotted outline in Fig. 1. The high-frequency rectifier 40 and the associated high-frequency filter 42, 43, 44 are enclosed in a shield represented by dotted outline 57. The coupling condenser 41 is preferably located close to the oscillator and if the lead therefrom to the rectifier 40 of the control unit is long or exposed, it should be of the shielded type with its sheath connected to shield 57, or other suitable point at the potential of the rectifier cathode, to avoid improper response of the motor under influence of stray fields. The unit may be provided with a terminal strip 58 to facilitate connection to external components.

Figure 2:
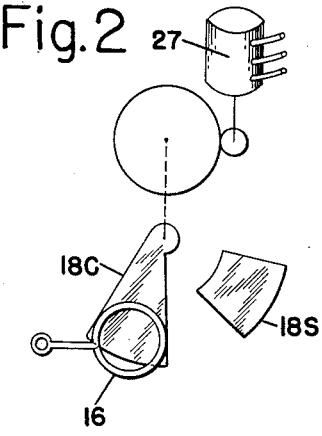
Fig. 2 is a detail view showing constructional features of parts appearing in Fig. 1.

The oscillator grid-circuit reactive device adjusted by motor 27 to compensate for variation of the electrical characteristics of the oscillator load may be of the construction shown in Fig. 2 providing for adjustment both of the grid-circuit inductance and the grid-circuit capacitance. One or more metallic plates or vanes 18C are disposed with their axis of rotation substantially parallel to the axis of the grid coil 16 so that the effective inductance of the coil may be varied by adjusting the extent to which the vane or vanes project into the coil. Assuming the vanes are of non-magnetic material, the coil inductance is more and more increased as the vanes are moved in counterclockwise direction from the full line position shown and reaches a maximum when the vanes pass outside of the coil; for continued movement in counterclockwise direction, the vanes 18C move parallel to and overlap the stator plates 18S to increase the effective capacitance of grid-condenser 18. In a tuned-plate tuned-grid oscillator, the resonant frequency of the grid circuit is somewhat higher than the frequency of the generated oscillations. As the resonant frequency of the tuned grid circuit approaches the frequency of oscillation, the grid drive is increased. Thus by increasing the grid-circuit inductance or the grid-circuit capacity, or both, the grid drive can be increased in avoidance of overheating of the anode; conversely by decreasing the grid-circuit inductance or capacity, or both, the grid drive can be decreased in avoidance of overheating of the grid.

In the system shown in Fig. 3, the oscillator circuit may be the same as that of Fig. 1 or, as shown in Fig. 3, the cathode of the oscillator and the B-terminal of the high-voltage D. C. supply may be connected to ground. In such event, the anode blocking condenser 60 isolates the tuned load circuit from the direct-current potential of the oscillator anode and the radio-frequency choke 61 minimizes flow of high-frequency oscillations from the anode to the D. C. high-voltage supply.

In the modified motor-control arrangement 56A of Fig. 3, there is not used the rectifier 40 and coupling condenser 41 of Fig. 1. Instead, the direct-current component of the oscillator grid-current is used to vary the direct-current bias of the grid-controlled rectifier 37. Preferably, the grid resistor 19A of the oscillator is shunted by a voltage-divider 62 provided with a movable contact 63 adjustable to apply a desired percentage of the D. C. voltage of the oscillator to the grid of tube 37.

During heating of load 13, the changes in electrical characteristics thereof affect the radio-frequency potential of the oscillator grid with resultant change in magnitude of the direct-current component of the grid-current. Accordingly, there is a temporary unbalance of the currents traversing the motor-winding 28, 29 which continues, to diminishing extent, until the grid-reactance, generically represented by coil 16, is adjusted by the motor to a new magnitude effecting proper potential of the grid under the changed load conditions.

Figure 4:
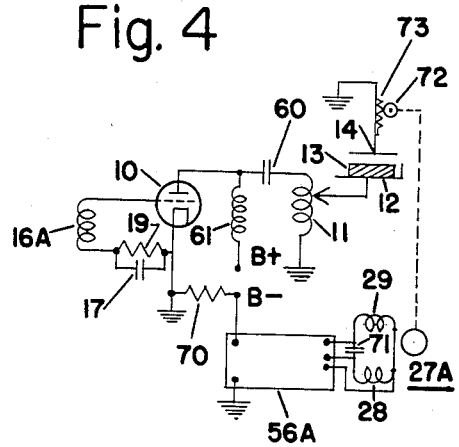
Figs. 4 to 7 are simplified circuit diagrams of other dielectric heating systems embodying the invention.

In the system shown in Fig. 4, the motor 27A is mechanically coupled, as by gear 72 and rack 73, to the movable heating electrode 14 and is controlled by a unit which as in Figs. 1 and 3 may be responsive to changes in operating potential of the oscillator grid or which as shown in Fig. 4 may respond to changes in the direct-current component of the anode current of the oscillator as measured, for example, by the voltage drop across resistor 70. This resistor is in the anode circuit of the oscillator tube 10 and in the input circuit of the control unit 56A of the motor; when the control unit is so used, it is of the type shown in Fig. 3 which does not use the input rectifier 40 of Fig. 1. For this same electrical connection of the control unit, the motor 27A may be utilized, as in Figs. 1, 3 and 7, to vary the grid-circuit reactance instead of the plate-circuit reactance as in Figs. 4 and 5.

In any of the systems herein shown, the motor may be of the reversible universal type comprising a split field winding and a commutator armature, or as shown in Fig. 4, it may be of the A. C. induction type having a split field and a capacitor 71 connected across the field-windings.

Figure 5:
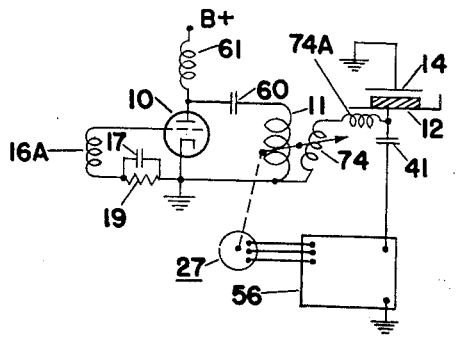

In the system shown in Fig. 5, the high-frequency potential of the work electrode 12 is applied to the control unit 56 through a blocking condenser 41, as in Fig. 1, to a rectifier 40 within the unit. The motor 27 may be used to vary the grid-circuit reactance of the oscillator as in Figs. 1, 3 and 7, the work-electrode spacing as in Fig. 4, or as shown in Fig. 5 it may vary the mutual inductance of a high-frequency transformer whose secondary winding 74 and series coil 74A is tuned by the capacitance of the heating electrodes 12, 14.

In all of the systems described, the motor 27 (or 27A) is continuously energized to produce opposing torques which become unbalanced upon departure from normal of the potential of that electrode or element of the high-frequency heating system selected for control of the grid-controlled rectifier tube 37. The motor armature in responding to the unbalanced torques readjusts selected circuit constants of the oscillator system continuously to maintain efficient operation of the oscillator tube despite the changes in electrical properties of the dielectric as it is heated to the desired temperature.

Figure 6:
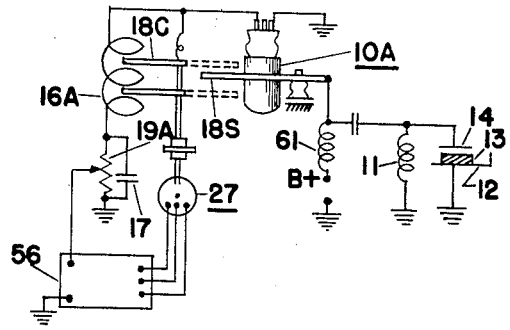

In the modification shown in Fig. 6, the combined variable-inductance and variable-capacity device of Fig. 2, is controlled by motor 27 to ensure safe and efficient operation of a TMT oscillator. In this arrangement, the inductance 16A is connected from grid to cathode and the variable capacity from grid to plate, in shunt to the internal grid-plate capacity of the tube. The particular tube 10A shown in Fig. 6 is of the type in which the anode forms part of the tube envelope so that the condenser stator 18S may be formed by the metal mounting flange of the tube. This is a preferred arrangement because it affords a maximum range of control affecting as it does both variation of the grid circuit impedance and the impedance of the feed-back coupling between the grid and plate circuits. When the vanes 18C are in the position indicated by solid lines, the tube has minimum excitation due both to minimum inductance of coil 16A and minimum grid-to-plate capacity; as the vanes 18C are moved out of the field of the coil 16A toward overlapping position with the flange 18S, the grid excitation increases and is at maximum when the vanes are in the dotted line position, Fig. 6. Preferably, as shown, in Fig. 2, the width of the vane is approximately the same as the diameter of the coil and the spacing between the coil and the stationary condenser plate is such that the inductance of the coil is at or about its maximum before the feed-back capacity is increased.

Figure 7:
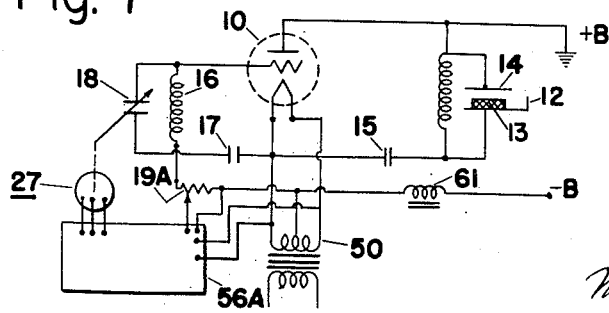

In the modification shown in Fig. 7, the oscillator is of the tuned-grid tuned-plate type and the motor 27 is utilized to vary the grid capacitor. The motor control system is of the type shown in Fig. 3 which does not use the rectifier 40 of Fig. 1. It is to be noted that in this modification, the grid and filament circuits of the oscillator are at high D. C. potential with respect to ground As all components of the motor control 56A are also at the same high D. C. potential with respect to ground, the accuracy of its control action is not affected by inadequacy of by-pass condensers from the cathode of the oscillator to ground or of presence of appreciable impedance between the cathode and such by-pass condensers which in addition to a rectifier 40 and blocking condenser 41 would be required if the control system, as in Fig. 1 or 3, had a ground point. With the arrangement of Fig. 7, the control unit 56A must include a transformer for stepping up the low-voltage supplied to the heater-cathode of tube 10 to value suited for energization of transformers 32 and 35 of the unit.

Though several systems embodying the invention have been disclosed in detail sufficiently to enable one skilled in the art to construct and use them, it is to be understood the invention is not limited thereto and that further variations and modifications may be made within the scope of the appended claims.

What is claimed is:

1. A dielectric heating system comprising an oscillator tube, a grid circuit therefor including reactance whose magniture affects the radio-frequency potential of the grid electrode of said tube, an anode circuit for said tube including reactance whose magnitude affects the radio-frequency potential of the anode electrode of said tube and including spaced electrodes between which a dielectric load is disposed for heating and forming therewith a third reactance, a feed-back reactance providing for sustained generation of oscillations by said tube, motor means for adjusting at least one of said reactances and having two windings, means for affecting continuous and constant energization of one of said windings, and means for effecting continuous and variable energization of the other of said windings including means responsive to departure of the radio-frequency potential of one of said electrodes from a predetermined magnitude, said motor means automatically adjusting said one of said reactances in compensation for changes in electrical characteristics of the load during heating thereof and at rate dependent upon the extent of departure of said potential from said predetermined magnitude thereof.

2. A system as in claim 1 including relay means energized by the motor current to interrupt the supply of anode current to said tube upon excessive departure of said motor current from normal.

3. A dielectric heating system comprising an oscillator tube, a grid circuit therefor including reactance whose magnitude affects the radio-frequency potential of the grid electrode of said tube, an anode circuit for said tube including spaced electrodes between which a dielectric load is disposed for heating, motor means for adjusting said reactance having two windings, means for effecting continuous and constant energization of one of said windings, and means for effecting continuous and variable energization of the other of said windings including means responsive to departure of said grid potential from a predetermined magnitude, said motor means adjusting said reactance in compensation for changes in electrical characteristics of the load during heating thereof.

4. A dielectric heating system comprising an oscillator tube, a grid circuit therefor including reactance whose magnitude affects the radio-frequency potential of the grid electrode of said tube, an anode circuit for said tube including spaced electrodes between which a dielectric load is disposed for heating, motor means for adjusting said reactance having two windings, a source of alternating current continuously effecting constant energization of one of said windings, a gaseous discharge tube in circuit with said source and the other of said windings, and a network for deriving from said grid circuit a direct-current biasing voltage applied to said discharge tube to vary energization of said other winding whereby said motor means adjusts said reactance in compensation for changes in electrical characteristics of the load during heating thereof.

5. A dielectric heating system comprising an oscillator tube, a grid circuit therefor including reactance whose magnitude affects the radio-frequency potential of the grid electrode of said tube, an anode circuit for said tube including spaced electrodes between which a dielectric load is disposed for heating, motor means for adjusting said reactance having two windings, a source of alternating current continuously effecting constant energization of one of said windings, a gaseous discharge tube in circuit with said source and the other of said windings, and a network including a rectifier connected to the grid of said oscillator tube for producing a direct-current biasing voltage applied to said discharge tube to vary energization of said other motor winding whereby said motor means adjusts said reactance in compensation for changes in electrical characteristics of the load during heating thereof.

6. A dielectric heating system comprising an oscillator tube, a coil and capacitor connected in series between the grid and cathode of said tube, an anode circuit for said tube including spaced electrodes between which a dielectric load is disposed for heating, motor means for varying the inductance of said coil having two windings, a source of alternating current for continuously effecting constant energization of one of said windings, a gaseous discharge tube in circuit with said source and the other of said motor windings, resistance means in shunt to said condenser for traverse by the direct-current component of the grid-current of said oscillator tube, and connections for applying the voltage drop of said resistance means to said discharge tube whereby said motor means varies the inductance of said coil in compensation for changes of the electrical characteristics of said load during heating.

7. A dielectric heating system comprising an oscillator tube, a grid circuit therefor including reactance whose magnitude affects the radio-frequency potential of the grid electrode of said tube, an anode circuit for said tube including reactance whose magnitude affects the radio-frequency potential of the anode electrode of said tube and including spaced electrodes between which a dielectric load is disposed for heating and forming therewith a third reactance, motor means for adjusting one of said reactances having two windings, a source of alternating current continuously effecting constant energization of one of said windings, a gaseous discharge tube having its anode circuit in series with said source and the other of said windings, means energized from said source to apply an alternating current bias to said gaseous discharge tube, and means for applying to said gaseous discharge tube a direct-current bias of magnitude varying as a function of one of said potentials whereby said motor means adjusts said one of said reactances in compensation for changes in electrical characteristics of said load during heating thereof.

8. In a high-frequency oscillator including an electronic tube having an electrode whose radio-frequency potential varies from optimum as a function of load with consequent dangerously inefficient operation of the oscillator, a reactance adjustable to vary the radio-frequency potential of said electrode, motor means for adjusting said reactance having two windings, a low-frequency power source for effecting continuous and constant energization of one of said windings, and means for effecting continuous and variable energization of the other of said windings comprising a gaseous discharge tube in circuit with said power source and the other of said windings, means for producing a direct current voltage of magnitude varying as a function of said oscillator-electrode potential, and means for applying said voltage to said discharge tube to vary the current supplied from said low-frequency source to said other motor winding whereby upon change in load said reactance is varied to minimize departure of said oscillator-electrode potential from optimum.

9. In a high-frequency oscillator including an electronic tube having an electrode whose radio-frequency potential varies from optimum as a function of load with consequent dangerously inefficient operation of the oscillator, a reactance adjustable to vary the radio-frequency potential of said electrode, a reversible AC—DC motor for adjusting said reactance, a low-frequency power source continuously energizing the armature and one field winding of said motor, a gaseous discharge tube whose anode circuit includes in series said power source, said armature and the other field winding of said motor, and means for deriving from the direct-current component of the current passed by said oscillator electrode a biasing voltage applied to said discharge tube to effect adjustment of said reactance by said motor in sense and to extent minimizing deviation of said oscillator-electrode potential from optimum.

10. A protective-control system for a high-frequency oscillator comprising a gaseous discharge tube, a grid-biasing circuit therefor including a filter network for attenuating currents of oscillator frequency and including resistance means for connection in an electrode circuit of said oscillator, a motor for adjusting a reactance of said oscillator and having two windings, connections for continuous constant energization of one of said motor windings from a low-frequency power source, and connections for including the other of said motor windings and the internal anode circuit of said discharge tube in series with said power source to provide for continuous variable energization of said other motor winding.

11. A protective-control system for a high-frequency oscillator comprising a motor for adjusting a reactance of said oscillator and having two windings whose relative energization determines the speed and direction of adjustment, connections for constant energization of one of said windings from a low-frequency power source, and means for effecting variable energization of the other of said windings from said power source comprising a gaseous discharge tube having its internal anode circuit in series with said other winding, a grid circuit for said discharge tube including resistance means traversed by current from said power source and resistance means traversed by direct-current in magnitude corresponding with current in an electrode circuit of said oscillator, phase-shifting means in circuit with said first-named resistance means for determining the phase-relation of the power-frequency potentials of the grid and anode of said discharge tube, and a filter network in said grid circuit for minimizing variation of the potential of said grid at oscillator frequency.

12. A protective-control system for a high-frequency oscillator comprising a motor for adjusting a reactance of said oscillator and having two windings whose relative energization determines the speed and direction of adjustment, connections for constant energization of one of said windings from a low-frequency power source, and means for effecting variable energization of the other of said windings from said power source comprising a gaseous discharge tube having its internal anode circuit in series with said other winding, a grid circuit for said discharge tube including a first resistance means traversed by current from said power source and a second resistance means effectively in series with said first resistance means, a rectifier for connection to an electrode of said oscillator, and an output circuit for said rectifier including said second resistance means and a filter network for attenuating currents of oscillator frequency.

13. A protective-control system for a high-frequency oscillator comprising a motor for adjusting a reactance of said oscillator and having two windings whose relative energization determines the speed and direction of adjustment, connections for constant energization of one of said windings from a low-frequency power source, and means for effecting variable energization of the other of said windings from said power source comprising a gaseous discharge tube having its internal anode circuit in series with said other winding, a grid circuit for said discharge tube including a first resistance means traversed by current from said power source and a second resistance means effectively in series with said first resistance means, a third resistance means traversed by the direct-current component of current in an electrode circuit of said oscillator, and a filter-network whose output and input circuits include said second and third resistance means respectively for attenuation of currents of oscillator frequency.

14. An excitation control system for an oscillator tube comprising a grid coil in the grid-cathode circuit of said tube, an anode-coil in the anode-cathode circuit of said tube, a capacitor member connected to the grid of said tube and movable in the field of one of said coils to vary its inductance independently of that of the other of said coils, and a fixed capacitor member connected to the anode of said tube and cooperating with said movable capacitor member for variation of the feed-back capacity between said grid and anode.

15. An automatic excitation control system for an oscillator tube comprising a coil connected between the grid and cathode of said tube, a resistor in series with said coil between said grid and cathode, a capacitor member connected to the grid of said tube and movable in the field of said coil to vary its inductance and so vary the radio-frequency potential of the grid, a fixed capacitor member connected to the anode of said tube and cooperating with said movable capacitor member for variation of the feed-back capacity between said grid and anode and therefore variation of the radio-frequency potential of the grid, a motor for adjusting said movable member, and electrical means responsive to variation of the DC grid-current traversing said resistor for controlling said motor to effect adjustment of said movable member in sense to maintain proper grid excitation of said oscillator.

HENRY R. WARREN.

REFERENCES CITED

The following references are of record in the file of this patent:

UNITED STATES PATENTS

| Number | Name | Date |
|---|---|---|
| 2,105,096 | Peterson | Jan. 11, 1938 |
| 2,358,454 | Goldstine | Sept. 19, 1944 |
| 2,367,681 | Karplus et al. | Jan. 23, 1945 |
| 2,376,667 | Cunningham et al. | May 22, 1945 |
| 2,393,400 | Noviks et al. | Jan. 22, 1946 |
| 2,415,799 | Reifel et al. | Feb. 11, 1947 |
| 2,416,172 | Gregory et al. | Feb. 18, 1947 |
| 2,438,595 | Zottu | Mar. 30, 1948 |
| 2,439,286 | Crosby | Apr. 6, 1948 |

Certificate of Correction

Patent No. 2,517,948　　　　　　　　　　　　　　　　　　August 8, 1950

HENRY R. WARREN

It is hereby certified that error appears in the printed specification of the above numbered patent requiring correction as follows:

Column 7, line 7, for "TMT" read *TNT*;

and that the said Letters Patent should be read as corrected above, so that the same may conform to the record of the case in the Patent Office.

Signed and sealed this 13th day of March, A. D. 1951.

[SEAL]

THOMAS F. MURPHY,
*Assistant Commissioner of Patents.*